United States Patent

Wright

[15] 3,674,190

[45] July 4, 1972

[54] CARRIER FOR RODS WITH REELS ATTACHED

[72] Inventor: George R. Wright, 508 First National Bank Bldg., Lincoln, Nebr. 68508

[22] Filed: Aug. 6, 1969

[21] Appl. No.: 847,949

[52] U.S. Cl. ..................................224/5 E, 43/26, 224/45 R
[51] Int. Cl. ..................................................A45f 5/00
[58] Field of Search ..................................224/5-7, 45; 43/25, 26

[56] References Cited

UNITED STATES PATENTS

| 2,591,674 | 4/1952 | Chalker | 43/26 X |
| 2,718,251 | 9/1955 | Barbato | 224/5 |
| 2,902,790 | 9/1959 | Harvey | 43/26 |
| 3,172,585 | 3/1965 | Mahaney et al. | 224/45 |
| 3,316,951 | 5/1967 | Jacobson | 224/5 X |
| 2,367,234 | 1/1945 | Mitchell | 150/1.5 R |

FOREIGN PATENTS OR APPLICATIONS 1,419,803  10/1965  France......................................43/26

Primary Examiner—Gerald M. Forlenza
Assistant Examiner—Jerold M. Forsberg
Attorney—Hiram A. Sturges

[57] ABSTRACT

A carrier for fishing rods with reels attached having an elongated member, a reel protecting means extending transversely of and substantially beyond at least two sides of the elongated member and disposed adjacent one end of the elongated member so as to protect at least two rods held against the two sides, means holding the rods to the elongated member, and a removable covering means covering said handles and reels, means holding the rods in spaced positions on the elongated member, a handle attached to a side of said covering means, the handle being a flexible strap of sufficient length to extend over the shoulder of a man of average height while the elongated member is adjacent his hip, the strap being of adjustable length.

8 Claims, 7 Drawing Figures

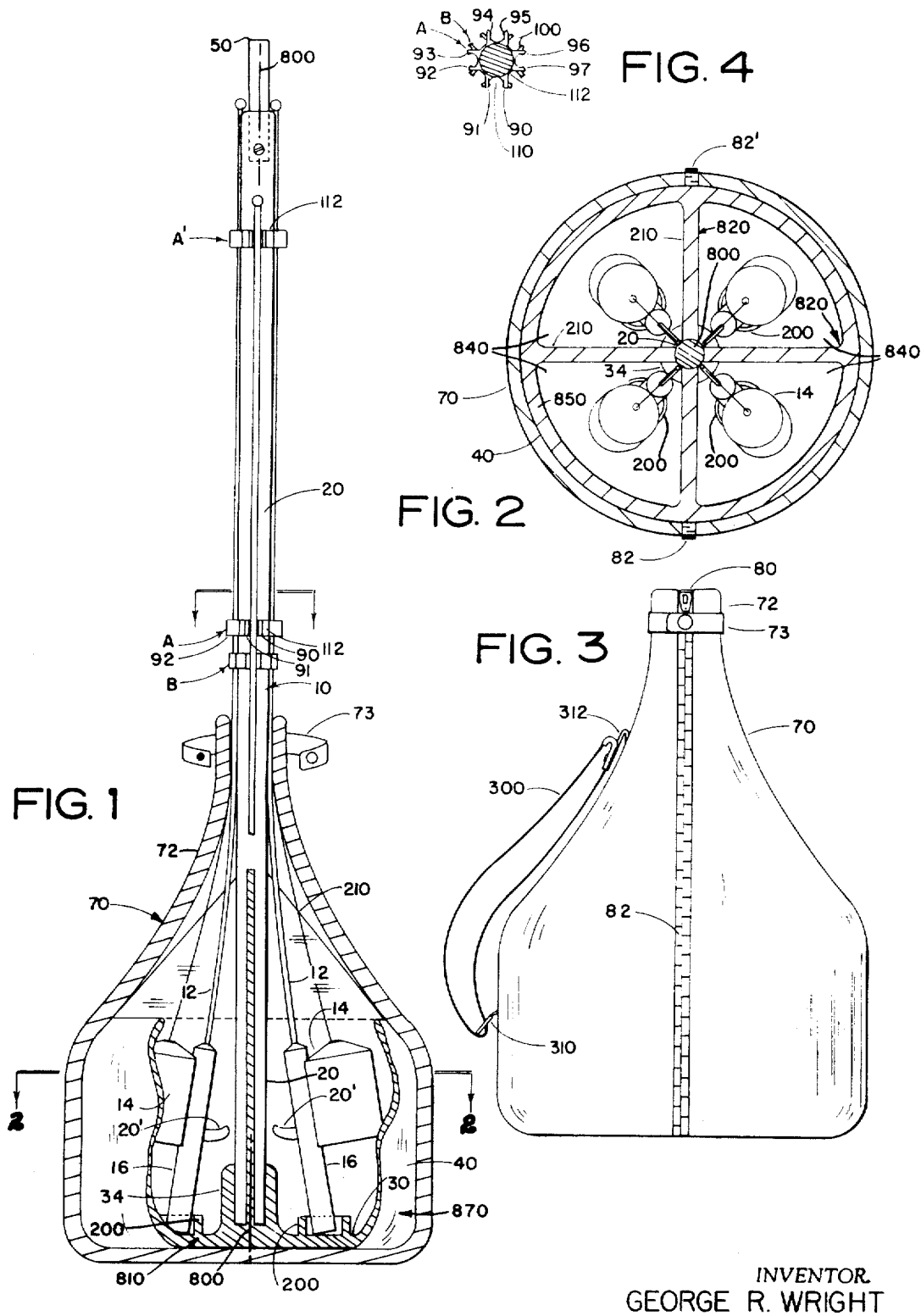

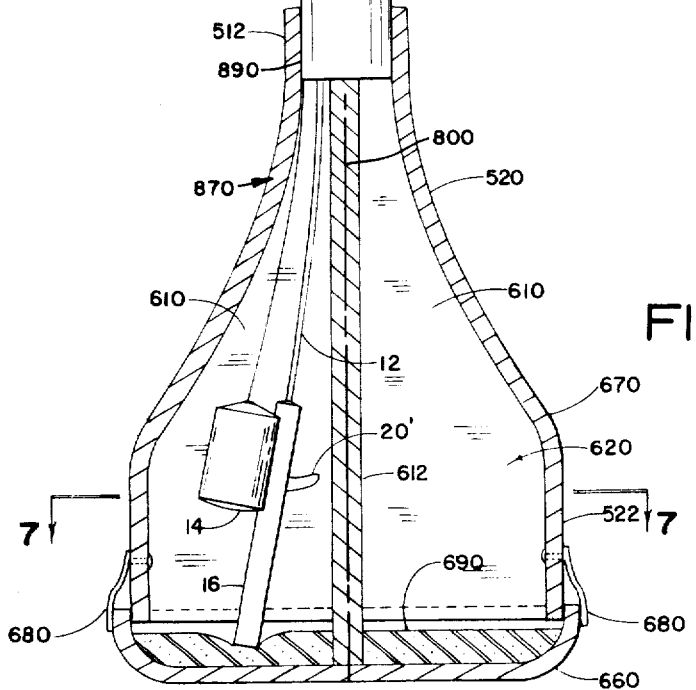
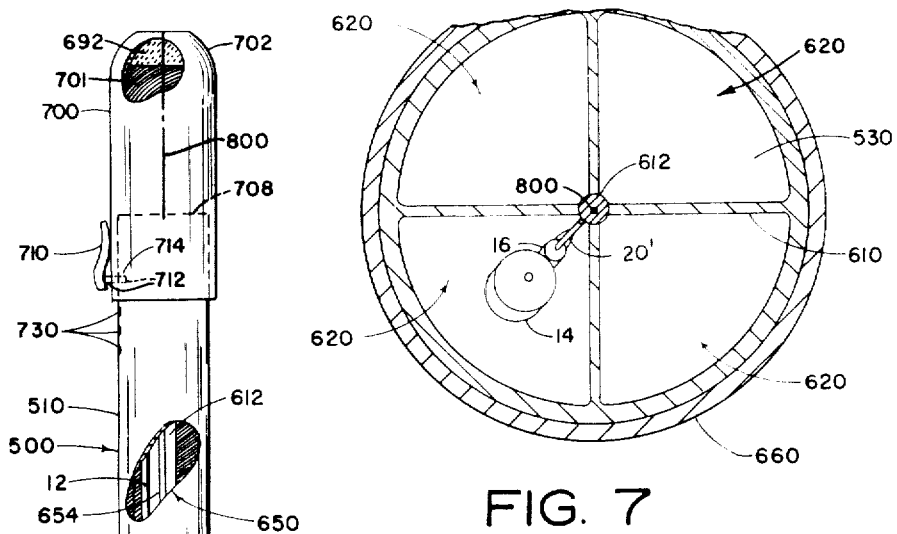
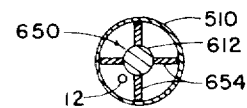

CARRIER FOR RODS WITH REELS ATTACHED

FIELD OF THE INVENTION

This invention is in the field of protective coverings in which fishing rods can be stored and carried when not in use.

DESCRIPTION OF THE PRIOR ART

In the prior art fishing rods are often carried about on portages or changes in fishing positions without any protective covering because this is preferred to the nuisance involved in taking the rods apart, and in taking the line and reels off of the rods in order to place the rods in tubes or attached to storage devices. To avoid rod breakage some fishermen prefer to take the rod apart, remove the reel and line and carry the rod in a tube, remounting the parts of the rod, replacing the reel and restringing the line all over again at each new place to fish. Some have proposed fishing rod holders which are designed to hold a single rod and a single reel. However, many fishermen carry more than one rod and so they are encumbered by the bulk of multiple rod carriers, each for a single rod. In some fishing parties a single person carries rods for the group or for a pair of fishermen on portages. In such cases also the multiple rod carriers, each carrying more than one rod, make bulky and cumbersome handling.

SUMMARY

A carrier for two and four or more fishing rods with reels attached having an elongated member, a reel protecting means extending transversely of and substantially beyond at least two sides of the elongated member and disposed adjacent one end of the elongated member, the reel protecting means being firmly attached to the elongated member and being sufficiently rigid so that when two rods are disposed on at least two protected sides of the elongated member with their handles adjacent the reel protecting member, the reel protecting member will extend laterally of the elongated member a distance greater than the reels to protect the reels.

The carrier is in further combination with a covering extending around the reel protecting member and extending toward the other end of said elongated member a sufficient distance for completely covering and protecting the reel, the covering being formed either of stiff material or of flexible material, which latter has one or two zippers therein extending lengthwise of said elongated member and extending to an open end of said flexible covering which is disposed toward the other end of said elongated member thereon, and securing means extending around said flexible covering releasably adjacent the open end thereof for relieving pressure on said zippers, and handle means in the form of an elongated strap which can be placed over the shoulder of an adult fisherman while being connected at its ends to said covering means and while said elongated member is carried at the fisherman's hip, the elongated strap being adjustable for reducing its length down to a size for use as a handle to be held in the hand with the arm of the fisherman extending downwardly while holding the carrier by its handle strap, means protruding from the sides of said elongated member for preventing fishing rods disposed alongside said elongated member from bumping each other and preferably comprising a plurality of resilient pairs of fingers disposed spaced apart and opposite each other, each finger of a pair being disposed more closely to the opposite finger of a pair adjacent ends of said fingers and adjacent said elongated member and the members of a pair being spaced apart sufficiently that a fishing rod can be pressed between a pair of fingers and beyond the outer portions of the fingers which are more closely spaced for retaining the fishing rod between the finger, the resiliency of the fingers permitting the fishing rod to pass portions of the fingers which are more closely spaced. A plurality of hollow retainers disposed adjacent but spaced from one end of said elongated member, said hollow retainers being disposed on different sides of said elongated member, means for securing said hollow retainers on said elongated members, said hollow retainers each having an open side facing said other end of said elongated member for receiving through said open sides the terminal ends of handles for fishing rods, dividing wall means disposed extending laterally outwardly on at least two opposite sides of said elongated member for separating and holding apart reels on fishing rods disposed on opposite sides of said separating means.

BRIEF DESCRIPTION OF THE DRAWING

FIG. 1 is a side elevation of the carrier of this invention held in a vertical position with various parts broken away for illustration of the interior thereof, and other parts showing in section.

FIG. 2 is a view -in- section taken along the line 2—2 of FIG. 1.

FIG. 3 is a side elevation of the lower portion of the invention but showing a covering portion thereof with zipper and carrying strap thereon.

FIG. 4 is a sectional view showing a rod gripping assembly of the invention.

FIG. 5 is a sectional view taken along the line 5—5 of FIG. 6 but showing only a hollow tubular portion of the invention and its interior, the remainder being removed.

FIG. 6 is a side elevation of a modification of the carrier of FIG. 1, held in vertical position with various parts broken away for illustration of the interior thereof and other parts shown in section.

FIG. 7 is a view in section taken along the line 7—7 of FIG. 1, an upper portion being broken away.

DESCRIPTION OF THE PREFERRED EMBODIMENTS

In FIG. 1 the fishing rod carrier of this invention is generally indicated at 10 and is particularly designed for carrying a plurality of fishing rods shown in dotted lines at 12 having reels 14 and handles 16, each rod also having an index finger receiving protrusion 20'..

The rods 12 are disposed alongside an elongated rigid member 20 of the invention and a reel protecting member or flange or reel protecting flange member 30 is provided extending transversely of and extending substantially laterally beyond the elongated member 20, the reel protecting flange member 30 being attached to a socket 34 with which it is integral into which latter the elongated member 20 fits and into which it is secured by suitable means such as cement, preferably plastic cement, since the member 20 and the member 30 are both preferably formed of plastic. The reel protecting member 30 can also have a collar attached thereto, the collar preferably being of cylindrical shape generally and extending in parallelism with the elongated member 20 and extending from the reel protecting flange member 30 toward that other end of the elongated member 20 which is shown at 50 and which is opposite that one end of the member 20 which is received in the socket 34. The collar and flange members 30 are both sufficiently rigid so that when a rod 12 is disposed alongside the elongated member 20 with his handle adjacent the reel protecting flange member 30, then the reel protecting flange member 30 will extend laterally of the elongated member 20 a distance greater than the reel 14 to protect the reel. The collar 40 also being rigid, further tends to protect the reel although the reel protecting flange member 30 itself will protect the reel to a great extent, especially with the assistance of a flexible cover 70 seen in FIGS. 1 and 3 which is substantially of a bag shape and extends over the reel protecting member 30 and collar 40 and upwardly along the upwardly along the elongated member 20, the cover 70 having a neck 72 which is more narrow so that the cover is substantially of a pear shape although flat at its larger end since the reel protecting flange member 30 is also flat on its side opposite the elongated member 20 so that the entire carrier can be rested on a flat surface and will stand in an upright position.

The flexible cover 70 is provided with two slits 80, seen in FIG. 3 one on each side thereof and on two opposite sides thereof, the slits 80 each being secured by one of two zippers 82 which latter extend along the slits and with the slits 80 extending toward the terminal ends of the neck 72.

As thus described by unzipping one of the zippers 82 one or more of the rods 14 which are four in number can be reached and they can reached still more easily by unzipping both zippers.

For convenience of illustration a cut out is made in the lower part of FIG. 3 which purports to cut completely through all parts of the carrier and contents and thereby cutting away all parts excepting the opposite side of the covering 70 so that the zipper shown at 82' illustrates the position of the zipper which is on the opposite side of the cover which likewise extends from its bottom to its top.

As best seen in FIGS. 1 and 4, a plurality of resilient pairs of fingers 90, 91 and 92 and 93, being two of the pairs respectively, 94 and 95 being still another pair, 96 and 97 being still another pair. These pairs of fingers are resilient and each finger of a pair is spaced apart opposite the other fingers of a pair, and each has a protrusion extending inwardly as at 100 toward the other finger of the pair and disposed outwardly of a concave portion of the inner side of each finger shown at 110. It is between the concave portions 110 that a fishing rod 12 is received with the diameter of the cross section of the rod 12 being greater than the distance between the protrusions 100 so that when a rod is pressed between the fingers 90 and 91, for example, of a pair the rod will enter so as to be held between the fingers inwardly of the protrusions 100.

The pairs of fingers 90, 91, etc are arranged in groups of four pairs on the four opposite sides and spaced 90° apart of a band 112, which latter can be secured to the preferably cylindrical elongated member 20 by plastic cement or other suitable means, the four pair of fingers and the band 112 being formed integrally in one piece from plastic for economy. It will be seen that four pairs of fingers attached to the same band 112 form a group and one such group shown at A in FIG. 1 on the elongated member adjacent the cover 70 but spaced from it considerably whereas, still another group another group called A'' is spaced farther out toward the other end 50 of the member 20 from the group A with the fingers of A and A' groups in alignment as seen lengthwise of the elongated member.

A second group of resilient finger pairs with a strap identical to a group A described, is disposed adjacent the group A described on the elongated member but it is rotated so that its fingers are 45° from fingers of the group A so that the fingers of the pairs of the group B can receive tip portions of rods which have been removed should unusually elongated rods be placed on the carrier whereby they are disposed between the remainder of the rods on the carrier.

The carrier described in which said covering means is formed of substantially rigid material and in which access to said covering means is through an opening at that end thereof which is adjacent said one end of said elongated member for access to the handle ends of rods therein, the opening means being covered by a lid which is removably secured to the remainder of, and forms a part of said covering means.

In FIG. 1 a plurality of hollow retainers 200 can be seen which are disposed adjacent but spaced from one end of the elongated member 20. The hollow retainers being disposed laterally spaced from the elongated member 20 on different sides thereof and they are secured to the elongated member 20 by suitable means such as by portions of the flange member 30 and its socket 34. Each hollow retainer 200 is open on that side thereof which faces the other end 50 for receiving therethrough the terminal ends of handles of fishing rods which are thereby kept from shifting from side to side.

Divider wall members 210, seen in FIGS. 1 and 2, are further provided extending laterally outwardly on at least two opposite sides and preferably on four sides of the elongated member 20 and are preferably integrally formed parts of the socket 34, reel protecting flange 30 and collar 40, so that they are all formed of one piece of plastic and of the same die set. The divider walls 210 are spaced 90° apart for receiving four fishing rods therebetween and for holding the reels therein apart so that they do not bump each other.

It will be seen that the retainers 200 are spaced from the elongated member 20 sufficiently for the receipt of the index finger protrusions 20 of a fishing rod between the elongated member 20 and the remainder of the rod at a time when the rod handle 16 is in a retainer 200.

Referring to FIG. 3, a handle strap is there shown at 300 which is received in strap holders 310 and 312, which latter are respectively secured to portions along the cover 70 which are spaced apart lengthwise of the elongated member 20, the strap 300 being adapted to be folded into a position for use as a handle to be gripped by a fisherman for carrying his arm downwardly, but the strap is also adapted to be pulled out and at such lengths as to fit over a fisherman's shoulder and yet be secured in the devices 310 and 312 at a time when the elongated member 20 is disposed substantially at the hip of the adult fisherman for convenience in carrying.

A modification of the invention can be seen in FIGS. 5, 6 and 7 in which a carrier 500 is provided which has a hollow tubular elongated member 510 disposed in lapping relationship with and inside the neck 512 of a substantially rigid cover 520, which latter is somewhat of a pear shape but with a flat bottom like the cover 70 and for the same reason. The tubular member 510 is secured to the cover 520 by a suitable means, and the cover 520 can be found to be very enlarged at its lower end 522 which latter has an opening therethrough 530, since the inside of the cover 520 is hollow. The opening 530 is divided by partitions 610 which are similar in all respects to the partitions 210, seen also in FIG. 7, since they are at least two in number and on opposite sides of a center 612, but are also preferably four in number disposed 90 degrees apart for creating four separate reel compartments 620 which latter communicate with the elongated tubular member 510 which is itself divided by a dividing assembly 650, seen in FIG. 5, comprising four spaced walls 654 spaced 90° apart for receiving rods in the separate four compartments created. The dividers 610 and 654 are preferably of soft material such as plastic so as not to damage the fishing rods.

The opening 530 at the lower end of the covering 520 is covered by a cap 660 which fits around the outer side of the main body portion 670 of the covering snugly and which is held in place releasably by a releasable suitcase clamp 680.

As seen in FIG. 6, the inner side of the cap 660 is lined with resilient sponge rubber or other resilient material 690 which is secured to the cap 660 and extends transversely of the elongated member 510 for receiving thereagainst the handle ends 16 of fishing rods 12.

As seen in FIG. 6, if the fishing rods 12 slide toward an opposite end 708 of the elongated member 510, they will engage a second resilient sponge rubber liner 692 disposed at the terminal end of the elongated member 510 and secured to the forward end 702 of an extension 700 telescopically received on the elongated member 510 but forming a part in a sense of the elongated member 510 because it is secured thereto by means of a spring clip 710 mounted on the member 700 and urging a detent 712 through an opening in the member 700 indicated at 714, so as to lodge in one of a plurality of holes 730 in that main part 740 of the elongated member 510 which telescopically receives the end portion 700 whereby the overall length of the elongated member 510 is extensible for the selection of one of the holes 730 to accommodate rods of different size and to contract the length of the holder and carrier when desired.

It will be seen that the elongated rigid member 20 of FIG. 1, or 612 of FIG. 7, can be considered a substantially rigid backbone means 20 or 612 extending along a first axis 800 which can be seen in dotted lines in FIG. 1 and at the center of FIG. 2 and at the center of FIG. 7.

The reel protecting flange member 30 of FIG. 1 can also be called a rigid reel-protecting transverse means 30 of FIG. 1, which latter can be seen to be much closer to the rearward end of the rod carrier than to the forward end thereof.

The backbone means 20 of FIG. 1 and 612 of FIG. 7 each respectively define in combination with the respective reel-protecting transverse means 30, a frame assembly generally indicated at 810 in FIG. 1.

A plane can be imagined as disposed along the lines 2—2 of FIG. 1 in a position transverse to the first axis 800, such plane being dividable into separate areas, each adapted to receive parts of separate rods, as seen in FIG. 2.

The separation means generally indicated at 820 being shown in FIG. 2 as comprising, as one possibility, the dividing walls 210, but also the separation means 820 can be thought of as being formed by the annular retainers 200 seen in FIGS. 1 and 2, which latter serve to separate portions of a plane transverse to the first axis 800 and which lies extending through the annular retainers 200.

It will be seen that the separation means 820, whether it be formed of walls 210 or annular retainers 200, in either case, serve to separate the respective plane into separate areas whereby each separate area can receive a part of a separate respective fishing rod and can prevent such received part of a respective fishing rod from bumping received parts of other fishing rods in the carrier.

It will be seen that the divider wall means 210 are each of a substantial length as measured forwardly to rearwardly thereof for effectively separating reels 14 on rods 12 in separate areas 840 of the rearward end portion 850 of the rod carrier 10 for preventing the reels 14 from bumping together just as the retainer wall means 200 each keep the rearward ends of the handle 16 of the rod 12 in place and at a distance from each other.

It is important that the separation means 820, when it is formed by the divider walls 210, extend out on two opposite sides of the first axis 800 respective distances which are greater than the distance from an outer side of an average fishing reel to the opposite side of a rod to which the reel is attached, as seen in FIGS. 1 and 2 whereby the dividing wall members 210 further serve to protect the reels 14 from damage by extending outwardly farther than they do from the central axis or first axis 800.

A substantially rigid housing means generally indicated at 870 can be formed by the collar 40 which substantially surrounds the sides of the backbone or elongated rigid member 20 and is attached to a frame assembly 810 defined by the backbone member 20 in combination with the reel-protecting transverse means or flange member 30, the substantially rigid housing 870 being spaced from the backbone means 20 far enough for at least two fishing reels 14 and attached rods 12 to fit between the substantially rigid housing means 870 and the backbone means 20.

Referring to FIG. 6, a substantially rigid tube or tubular elongated member 510 is seen to extend forwardly from the forward end of the rigid housing means 870 for receiving forward portions of rods, the forward end of the rigid housing means 870 in FIG. 6 having a tube-receiving opening 890 therein and facing forwardly along the first axis 800 and the tube or tubular member 510 is tightly received in the tube-receiving opening 890.

Referring to FIG. 6, an extension or cap 700 is there shown which has a recess 701 in its rearward end which is very deep and which slidably receives the forward end of the tubular member 510 thereon.

Referring to FIG. 2, it can be seen that the partition wall means 210 comprise in combination a bracing means which can be called a bracing means or a separation means 820 of which each partition wall 210 is a brace.

In this sense, the bracing means 820 is attached to the sides of the backbone means 20 on a plurality of the sides thereof and a bracing means 210 or 820 respectively extends forwardly from and is attached to only the forward side of the reel-protecting transverse means 30 and a bracing means 820 extends a substantial distance forwardly from the reel-protecting transverse means 30 so as to strongly brace the backbone 20 in its attachment to only the forward side of the reel-protecting transverse means 30.

I claim:

1. A rod carrier for simultaneously carrying a plurality of fishing rods with reels attached comprising a substantially rigid elongated backbone means extending along a first axis and having a substantially continuous outer surface, said backbone means having a forward end and a rearward end, a substantially rigid reel protecting transverse means extending transversely of said first axis and extending substantial distances from said first axis on all sides of said axis, said reel protecting transverse means being concave on its forward side and defining a rear wall means extending transversely of said backbone and having a substantially rigid protective collar extending forwardly from and attached to said rear wall means, said rear wall means having sufficient rearwardmost surface portions widely spaced from said axis and spaced around said axis sufficiently and lying substantially in a plane disposed at a right angle to said backbone means whereby said carrier can be rested balancing upright on a horizontal surface with its rearward end downward and otherwise unsupported, means attaching said reel protecting transverse means to said backbone means firmly, said reel protecting transverse means being much closer to the rearward end than to the forward end of said rod carrier, said reel protecting transverse means and said backbone means together defining a frame assembly, there being a plane disposed transverse to said axis which is dividable into separate areas, a plurality of divider wall means attached to said frame assembly and each of substantial length as measured forwardly to rearwardly thereof and each of substantial area for separating said plane into said separate areas sufficiently that rearward end portions of rods with reels attached thereto can be received between said divider walls respectively and said reels can be prevented from bumping each other by said divider wall means, and resilient finger means attached to said backbone means for holding forward portions of rods on said carrier in at least approximate parallelism with said axis, said carrier having a removable covering means having a large rearward end enclosing the reel protecting transverse means and tapering to a narrow neck portion which latter has an opening at its forward end, said covering means also having an annular section extending around at least a portion of the length of said backbone means, said carrier having a forward half portion which is less than half as bulky than its rearward half portion as measured transversely of said backbone means in any direction, all parts of said carrier being substantially balanced about said axis so that said carrier is best adapted to balance in upright position and to rest on its rearward end on a horizontal surface and without other support, said collar being disposed far enough from said axis so that said plurality of rod rearward end portions and said reels attached thereto can be received within said collar, said carrier being free of legs projectable from its sides for stability when standing upright.

2. The combination of claim 1 in which each said divider wall means is attached to said backbone means and to said transverse means.

3. The combination of claim 1 in which hollow annular retainers having open forward ends are attached to the forward side of said rear wall, said retainers each being of a size for receiving an end of a handle of one of said rods.

4. The combination of claim 1 in which said removable covering means has two elongated slits spaced around said axis sufficiently and extending from said opening toward said rearward wall a sufficient distance for facilitating removal of rods with reels attached from between said divider wall means.

5. The combination of claim 4 in which zippers are attached to said covering means to close said slits respectively.

6. The combination of claim 4 in combination with at least two fishing rod and reel assemblies disposed alongside of said backbone means with their reels separated by respective divider wall means.

7. The combination of claim 1 in which said divider wall means are attached specifically to said collar and to said backbone means.

8. The combination of claim 1 in combination with at least two fishing rod and reel assemblies disposed alongside of said backbone means with their reels separated by respective divider wall means.

* * * * *